(12) United States Patent
Park et al.

(10) Patent No.: US 11,618,058 B2
(45) Date of Patent: Apr. 4, 2023

(54) VIBRATION ACTUATOR DEVICE

(71) Applicant: ELECTRONICS AND TELECOMMUNICATIONS RESEARCH INSTITUTE, Daejeon (KR)

(72) Inventors: Kang-Ho Park, Daejeon (KR); Hye Jin Kim, Daejeon (KR); Seongwoo Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1153 days.

(21) Appl. No.: 16/213,289

(22) Filed: Dec. 7, 2018

(65) Prior Publication Data

US 2020/0130013 A1 Apr. 30, 2020

(30) Foreign Application Priority Data

Oct. 31, 2018 (KR) .......................... 10-2018-0132589

(51) Int. Cl.
  *B06B 1/06* (2006.01)
  *A61H 23/02* (2006.01)
  *G06F 3/01* (2006.01)

(52) U.S. Cl.
  CPC ....... *B06B 1/0666* (2013.01); *A61H 23/0245* (2013.01); *G06F 3/016* (2013.01)

(58) Field of Classification Search
  CPC ....... B06B 1/0666; B06B 1/06; B06B 1/0644; H01L 41/08; H01L 41/0926

USPC ................................. 310/334, 329, 324, 348
See application file for complete search history.

(56) References Cited

U.S. PATENT DOCUMENTS

| | | | |
|---|---|---|---|
| 7,077,015 B2 | 7/2006 | Hayward et al. | |
| 9,264,814 B2 | 2/2016 | Je et al. | |
| 2008/0079331 A1* | 4/2008 | Butler | B06B 1/0603 310/331 |
| 2010/0165794 A1* | 7/2010 | Takahashi | H04R 17/00 367/189 |
| 2013/0041235 A1 | 2/2013 | Rogers et al. | |
| 2014/0061825 A1 | 3/2014 | Lee et al. | |
| 2014/0175947 A1* | 6/2014 | Kim | H03H 9/17 310/329 |
| 2018/0175746 A1 | 6/2018 | Van Den Ende et al. | |

FOREIGN PATENT DOCUMENTS

KR     2018/0015708 A     2/2018

* cited by examiner

*Primary Examiner* — Derek J Rosenau
(74) *Attorney, Agent, or Firm* — Rabin & Berdo, P.C.

(57) ABSTRACT

Disclosed is a vibration actuator device. The vibration actuator device includes a substrate, lower supports disposed on the substrate and spaced apart from each other in a first direction, an actuator disposed on the lower supports to generate a vibration having a first resonant frequency by an external power, a vibration plate disposed on the actuator to vibrate in accordance with the actuator, and a mass portion disposed on the vibration plate to vibrate in accordance with the actuator and the vibration plate. Here, each of the vibration plate and the mass portion has a second resonant frequency that is less than the first resonant frequency.

13 Claims, 16 Drawing Sheets

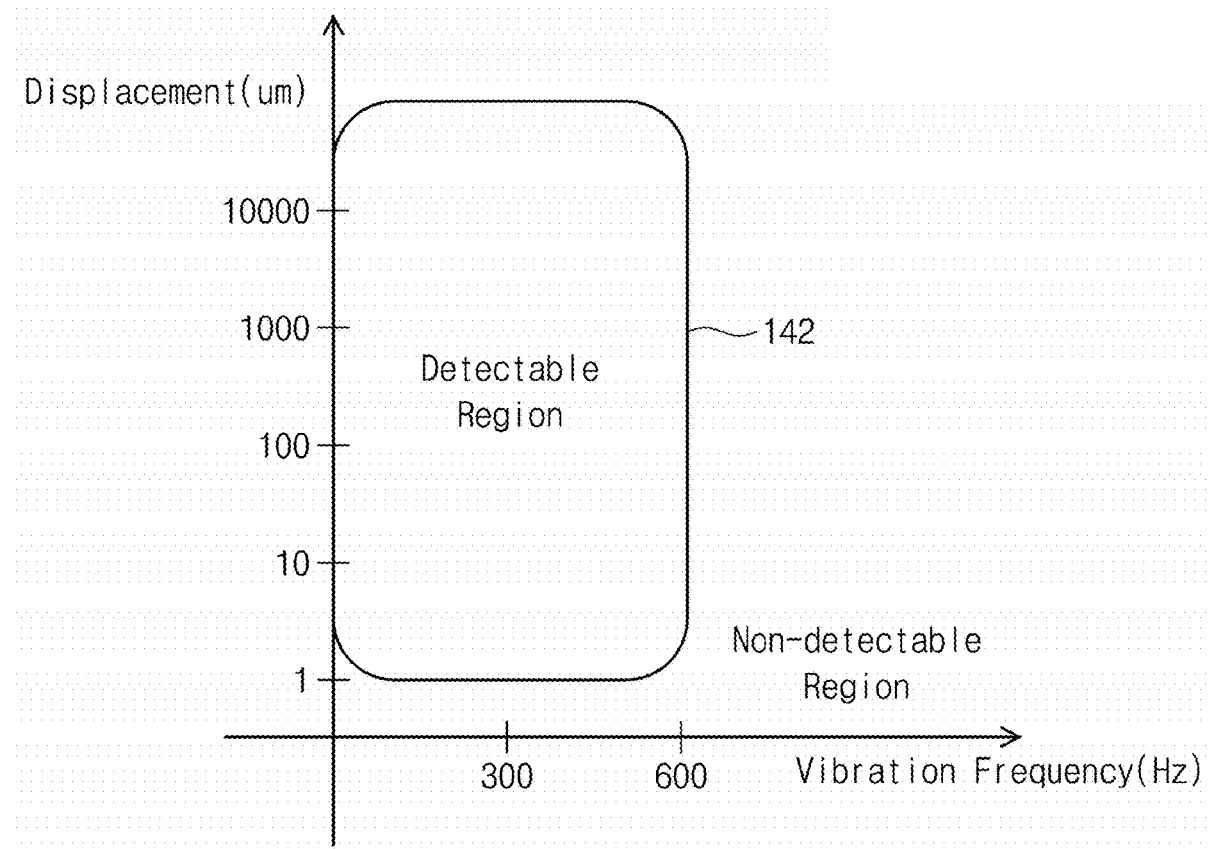

FIG. 4
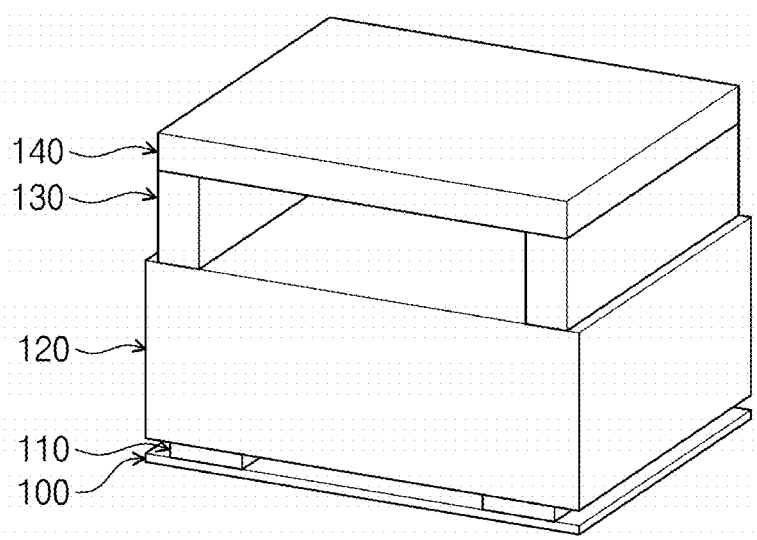
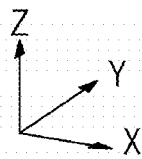

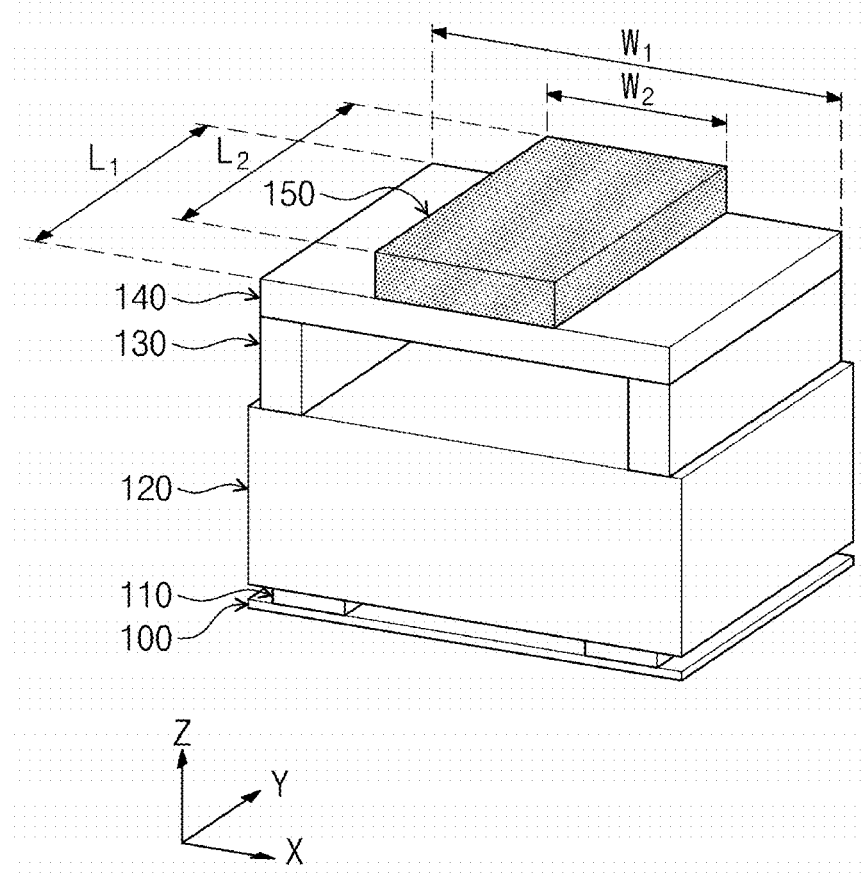

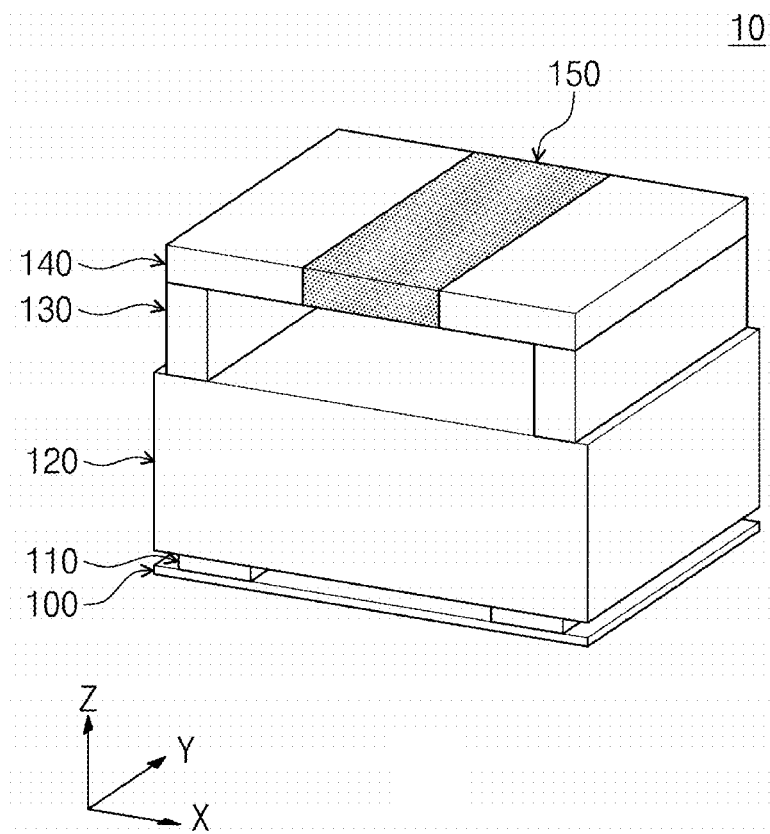

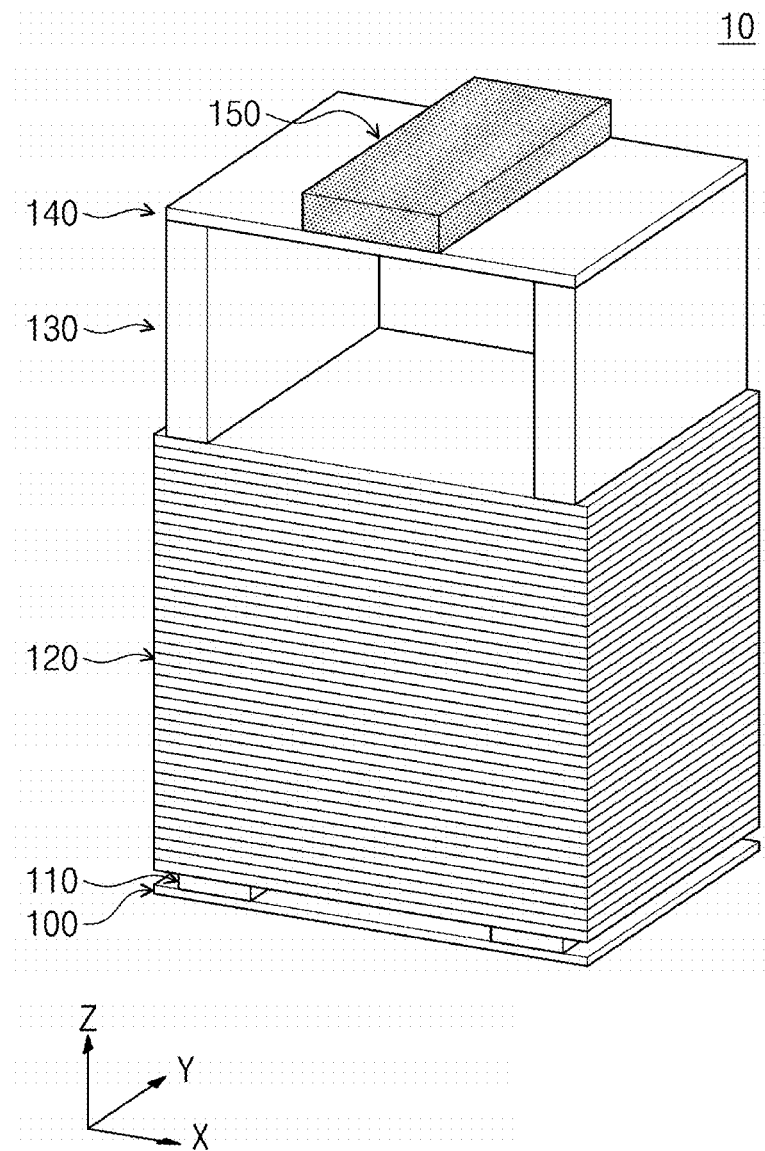

FIG. 13A
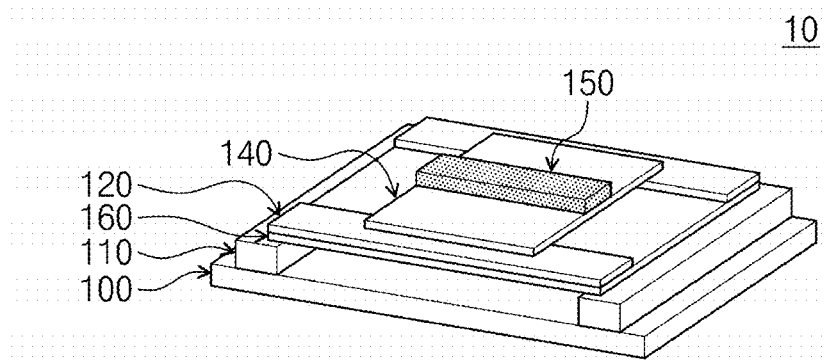
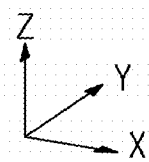
FIG. 13B
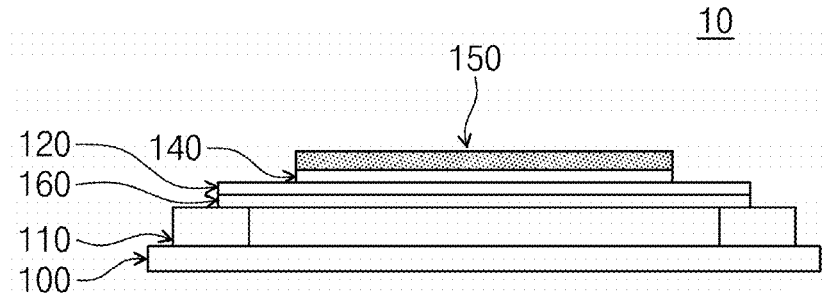

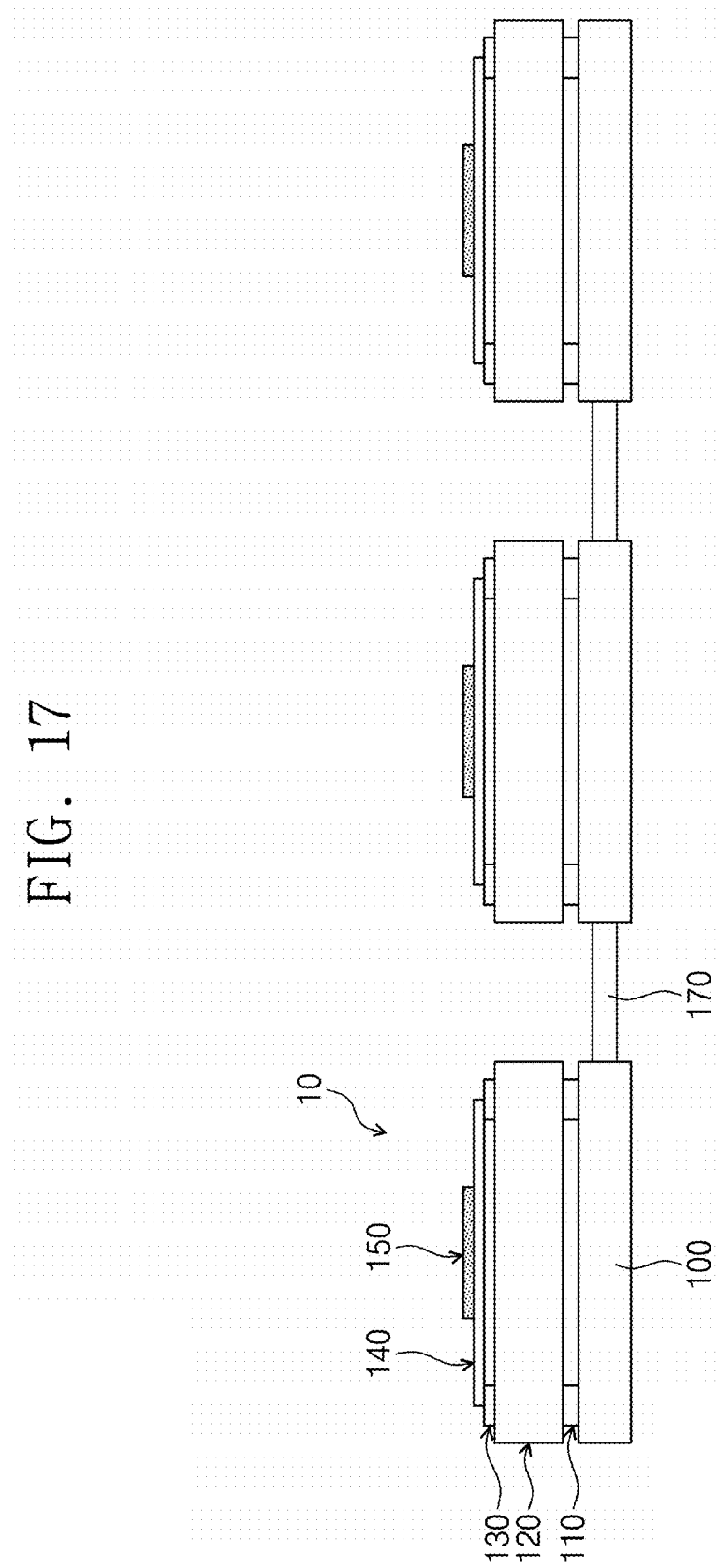

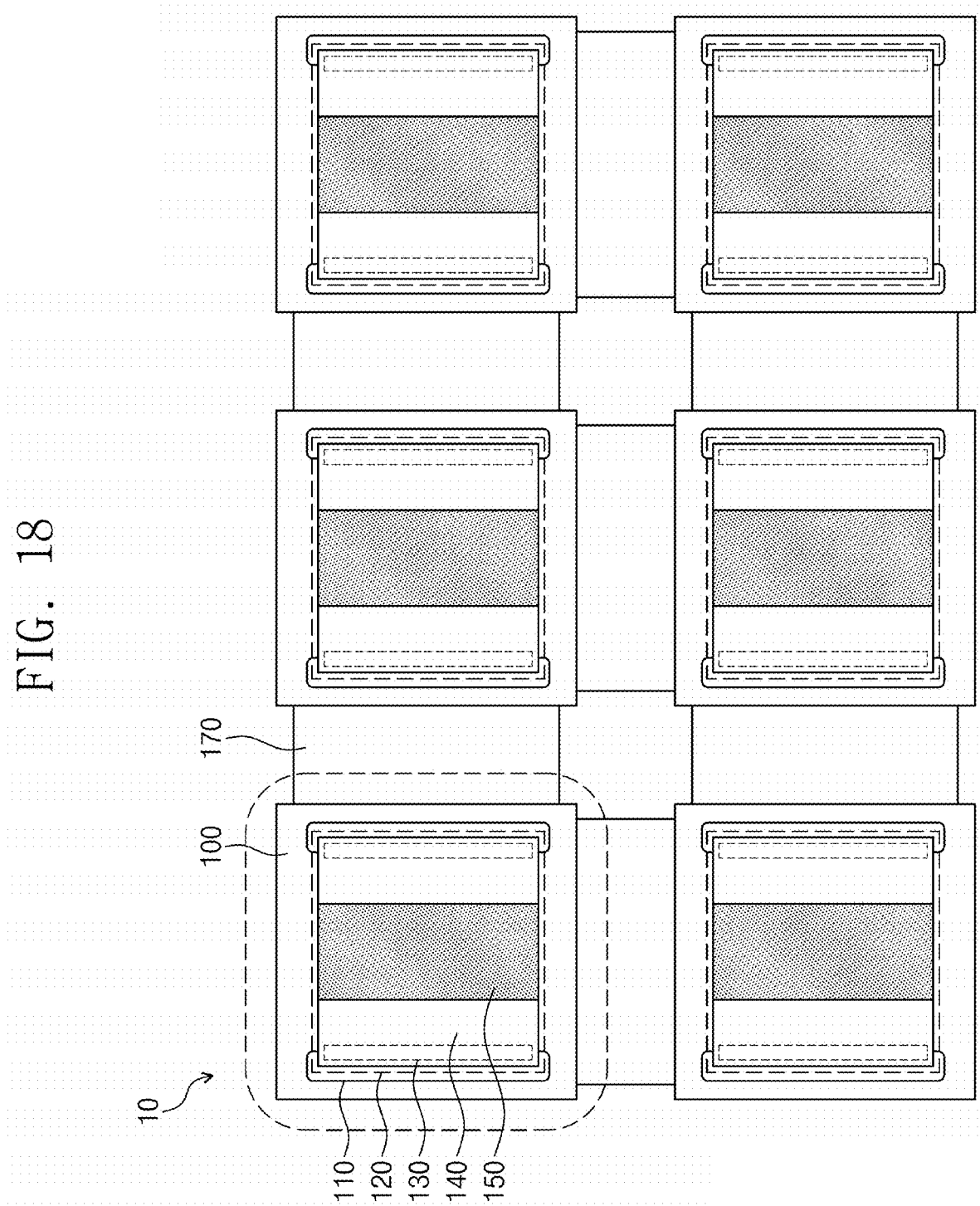

VIBRATION ACTUATOR DEVICE

CROSS-REFERENCE TO RELATED APPLICATIONS

This U.S. non-provisional patent application claims priority under 35 U.S.C. § 119 of Korean Patent Application No. 10-2018-0132589, filed on Oct. 31, 2018, the entire contents of which are hereby incorporated by reference.

BACKGROUND

The present disclosure herein relates to a vibration actuator device.

In general, a vibration actuator device may generate a vibration by using an electric motor, a piezoelectric device, an electrostrictive device, a capacitive device, or the like. The vibration actuator device may realize a function of transmitting a vibration to a portion of a skin or a finger tip of a human body. The human body may detect the vibration through a tangoreceptor disposed below the skin. The vibration actuator device is a multifunctional device that is applicable to a touch screen, a field of augmented reality (AR)/virtual reality (VR)/mixed reality (MR), or various technological and industrial fields such as bio-diagnosis/treatment.

SUMMARY

The present disclosure provides a vibration actuator device providing a vibration that is detectable by a human body.

An embodiment of the inventive concept provides a vibration actuator device including: a substrate: lower supports disposed on the substrate and spaced apart from each other in a first direction; an actuator disposed on the lower supports to generate a vibration having a first resonant frequency by an external power; a vibration plate disposed on the actuator to vibrate in accordance with the actuator; and a mass portion disposed on the vibration plate to vibrate in accordance with the actuator and the vibration plate. Here, the vibration plate and the mass portion have a second resonant frequency less than the first resonant frequency.

In an embodiment, the vibration actuator device may further include upper supports disposed between the actuator and the vibration plate and spaced apart from each other in the first direction.

In an embodiment, the mass portion may have an area that is equal to or less than a half of an area of the vibration plate.

In an embodiment, the actuator may be provided in plurality, and the plurality of actuators may be spaced apart from each other in a second direction crossing the first direction.

In an embodiment, the vibration plate may be disposed between the plurality of actuators.

In an embodiment, the vibration actuator device may further include a support plate disposed between the plurality of actuators and the lower supports.

In an embodiment, the mass portion may be disposed in the vibration plate between the lower supports.

In an embodiment, the actuator may be provided in plurality, and the plurality of actuators may be stacked.

In an embodiment, the vibration plate may have an area of about 5×5 mm² or less.

In an embodiment, the mass portion may have a height of about 5 mm or less from the substrate.

In an embodiment, the resonant frequency may be about 600 Hz or less.

In an embodiment, the vibration plate may include PDMS, polyimide, silicone, or Ecoflex.

In an embodiment, the vibration plate may further include an elastomer.

In an embodiment, the actuator may include a piezoelectric device.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 3 is a view illustrating a detectable region of a human body;

FIG. 4 is a perspective view illustrating a general vibration actuator device;

FIG. 6 is a perspective view illustrating a mass portion having a width greater than a half of a width of the vibration plate in FIG. 1;

FIG. 10 is a perspective view illustrating a vibration actuator device according to an embodiment of the inventive concept;

FIG. 11 is a perspective view illustrating a vibration actuator device according to an embodiment of the inventive concept;

FIGS. 13A and 13B are a perspective view and a cross-sectional view illustrating a vibration actuator device according to an embodiment of the inventive concept;

FIGS. 17 and 18 are views illustrating an applied example of the vibration actuator device 10 according to an embodiment of the inventive concept.

DETAILED DESCRIPTION

Figure 1A:
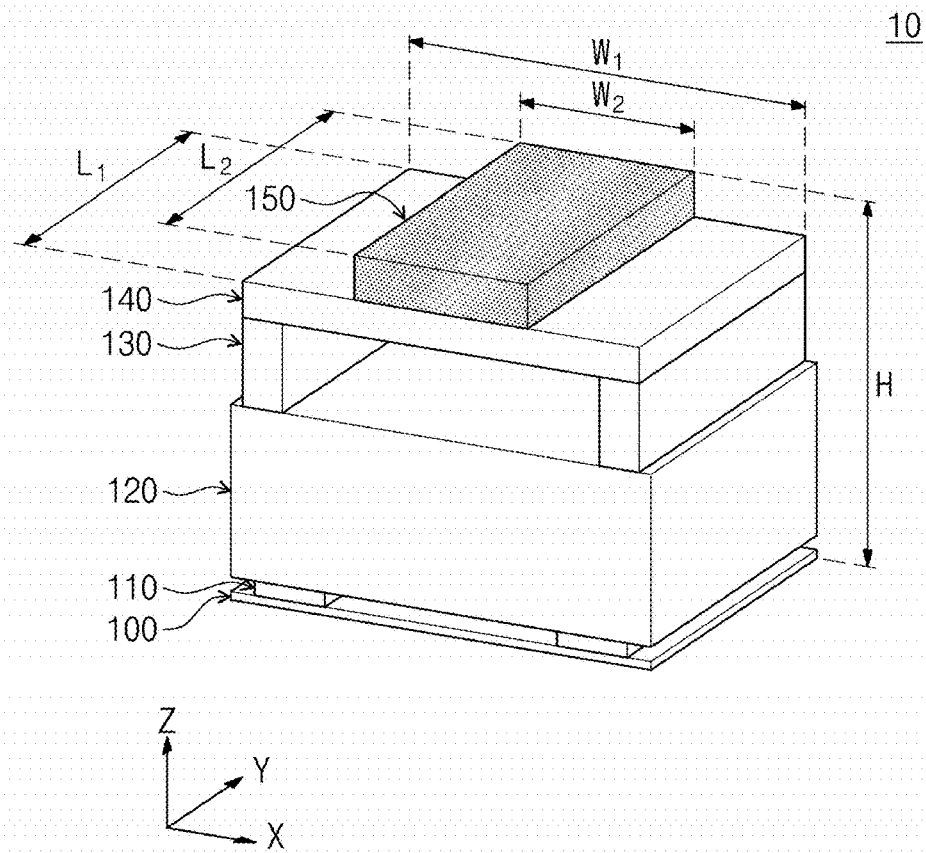
FIGS. 1A and 1B are views illustrating a vibration actuator device 10 according to an embodiment of the inventive concept.

Hereinafter, preferred embodiments of the inventive concept will be described below in detail with reference to the accompanying drawings. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

In the following description, the technical terms are used only for explaining a specific exemplary embodiment while not limiting the present disclosure. In this specification, the terms of a singular form may include plural forms unless specifically mentioned. The meaning of "include," "comprise," "including," or "comprising," specifies a property, a region, a fixed number, a step, a process, an element and/or a component but does not exclude other properties, regions, fixed numbers, steps, processes, elements and/or components. Since preferred embodiments are provided below, the order of the reference numerals given in the description is not limited thereto.

The embodiments in the detailed description will be described with sectional views and/or plain views as ideal exemplary views of the present disclosure. Therefore, the embodiments of the inventive concept are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the present disclosure.

Figure 1B:
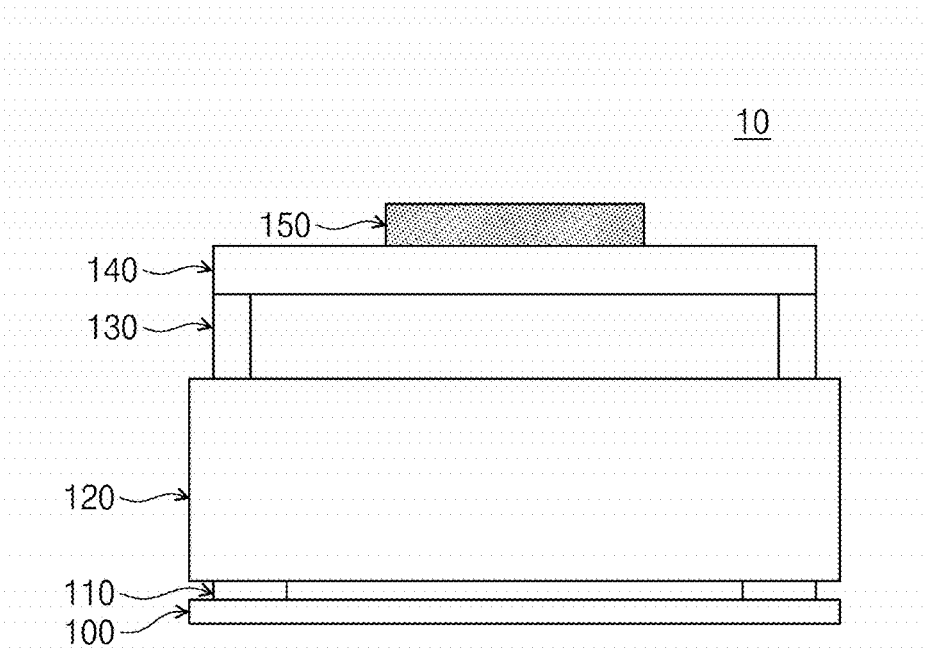

FIGS. 1A and 1B are views illustrating a vibration actuator device 10 according to an embodiment of the inventive concept.

Referring to FIGS. 1A and 1B, the vibration actuator device 10 according to an embodiment of the inventive concept may include a substrate 100, lower supports 110, an actuator 120, upper supports 130, a vibration plate 140, and a mass portion 150.

The substrate 100 may include a case or glasses of a wearable device of AR, VR, and MR. However, the embodiment of the inventive concept is not limited thereto. For example, the substrate 100 may include a mobile phone, a tablet PC, or a touch screen. Although not shown, power lines connected to the actuator 120 may be mounted to the substrate 100.

The lower supports 110 may be disposed on the substrate 100. The lower supports 110 may be spaced apart from each other in a first direction X. For example, the lower supports 110 may be disposed within a distance of about 5 mm or less. Each of the lower supports 110 may include a metal block made of iron (Fe) and a dielectric block made of ceramic, an organic material, or a silicon oxide.

The actuator 120 may be disposed on the lower supports 110. The actuator 120 may be a vibration source that generates a vibration having a first frequency by an external electric power. The first frequency may be a high frequency of about several Hz to about several hundreds KHz. The actuator 120 may generate a resonant frequency of about 1 KHz. A human body may not detect the resonant frequency of the actuator 120. The actuator 120 may include a piezoelectric device or an electrostrictive device. The actuator 120 may have an area of about 5×5 mm$^2$ or less and a thickness of about 1 mm or less.

The upper supports 130 may be disposed on the actuator 120. The upper supports 130 may be parallel to the lower supports 110. The upper supports 130 may be spaced apart from each other in the first direction X. For example, the upper supports 130 may be spaced within a distance of about 5 mm or less from each other. The upper supports 130 may be the same as the lower supports 110. Each of the upper supports 130 may include a metal block made of iron (Fe) and a dielectric block made of ceramic, an organic material, or a silicon oxide.

The vibration plate 140 may be disposed on the upper supports 130. The vibration plate 140 may be made of a material different from that of the actuator 120. For example, the vibration plate 140 may include an elastic material (e.g., PDMS, PMMA, Ecoflex, silicone, or polyimide) or elastomer. The vibration plate 140 may have an area of about 5×5 mm$^2$ or less and a thickness of about 1 mm or less. The vibration plate 140 may vibrate in accordance with the actuator 120.

The mass portion 150 may be disposed on the vibration plate 140. The mass portion 150 may be disposed between the upper supports 130. The mass portion 150 may be parallel to the upper supports 130. The mass portion 150 may include a metal block. According to an embodiment, the mass portion 150 may have a width W2 that is less than a width W1 of the vibration plate 140. For example, the width W2 of the mass portion 150 may be less than a half of the width W1 of the vibration plate 140. That is, the mass portion 150 may have a surface that is less than a half of an area of the vibration plate 140. When the vibration plate 140 has the width W1 of about 5 mm, the mass portion 150 may have the width W2 of about 2.5 mm or less. The mass portion 150 may have a length L2 that is equal to or less than a length L1 of the vibration plate 14. The mass portion 150 may have a shape having various structures such as a cylindrical shape in addition to a hexahedral shape. The mass portion 150 may have a height H of about 5 mm or less from the substrate 100. The vibration plate 140 and the mass portion 150 may vibrate in accordance with the actuator 120. For example, each of the vibration plate 140 and the mass portion 150 may have a resonant frequency that has a greatest vibration displacement according to variation of the first frequency. According to an embodiment, each of the vibration plate 140 and the mass portion 150 may have a resonant frequency less than that of the actuator 120. The resonant frequency may be inversely proportional to a mass of each of the vibration plate 140 and the mass portion 150 and proportional to an elastic modulus K of the vibration plate 140. The resonant frequency may be a frequency that is detectable by a human body. The resonant frequency may be about 600 Hz or less. A displacement of the mass portion 150 may be about 1 μm or more, and a force of the vibration plate 140 and the mass portion 150 may be about 0.001 N or more.

Figure 2A:
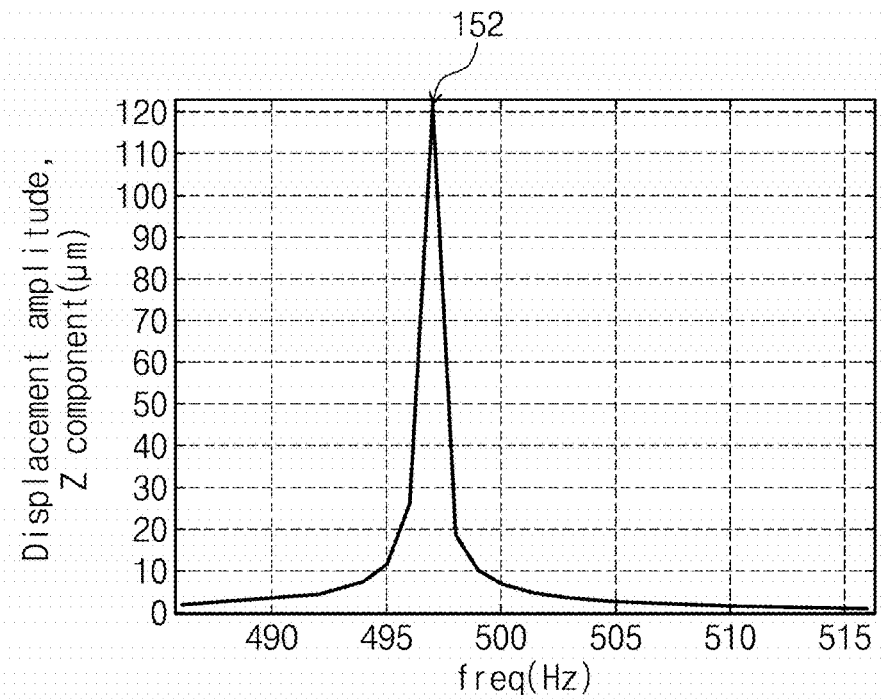
FIGS. 2A and 2B are graphs showing a resonant frequency of a vibration plate and a mass portion in FIG. 1.
Figure 2B:
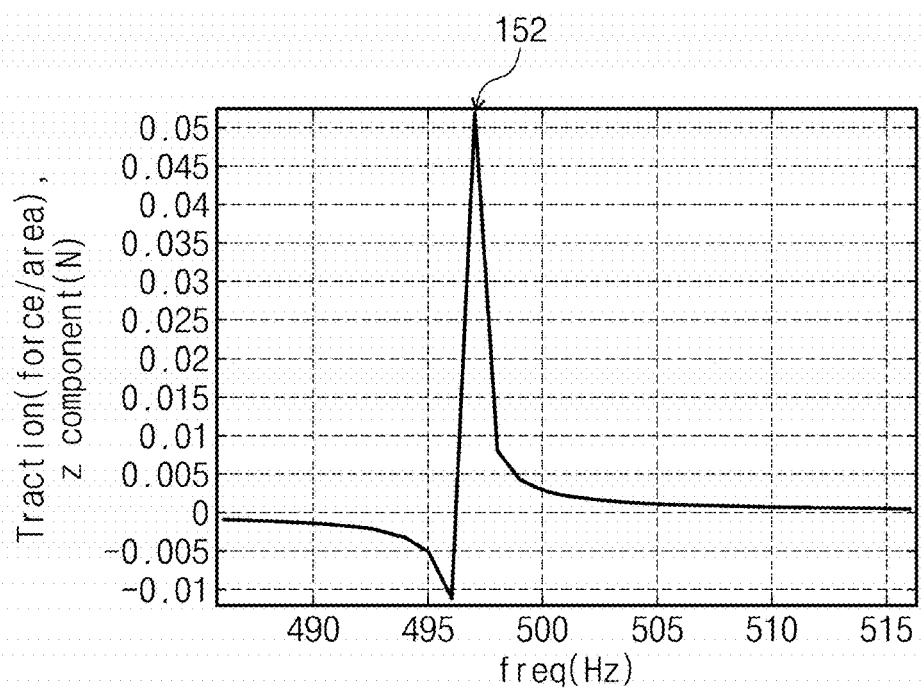

FIGS. 2A and 2B show a resonant frequency 152 of the vibration plate 140 and the mass portion 150 in FIG. 1.

Referring to FIGS. 2A and 2B, the vibration plate 140 and the mass portion 150 may have the resonant frequency 152 of about 496 Hz, the displacement of about 120 μm, and the force of about 0.06 N or more when the vibration plate 140 and the mass portion 150 vibrate. A human body may sense or detect the vibration of the vibration plate 140 and the mass portion 150.

FIG. 3 illustrates a detectable region 142 of a human body. In FIG. 3, a horizontal axis represents a frequency, and a vertical axis represents a displacement.

Referring to FIG. 3, the detectable region of the human body may have the resonant frequency 152 of about 600 Hz or less and the displacement of about 1 μm or more. The human body may sense or detect vibration within the detectable region 142. For example, the human body may readily sense vibration having a frequency of about 200 Hz to about 320 Hz. However, the human body may not sense or detect vibration having the resonant frequency 152 of about 600 Hz or more and vibration having the displacement of about 1 μm or less.

FIG. 4 illustrates a general vibration actuator device 20.

Referring to FIG. 4, the vibration plate 140 of the general vibration actuator device 20 may vibrate in accordance with the actuator 120 without the mass portion 150 in FIG. 1.

Figure 5A:
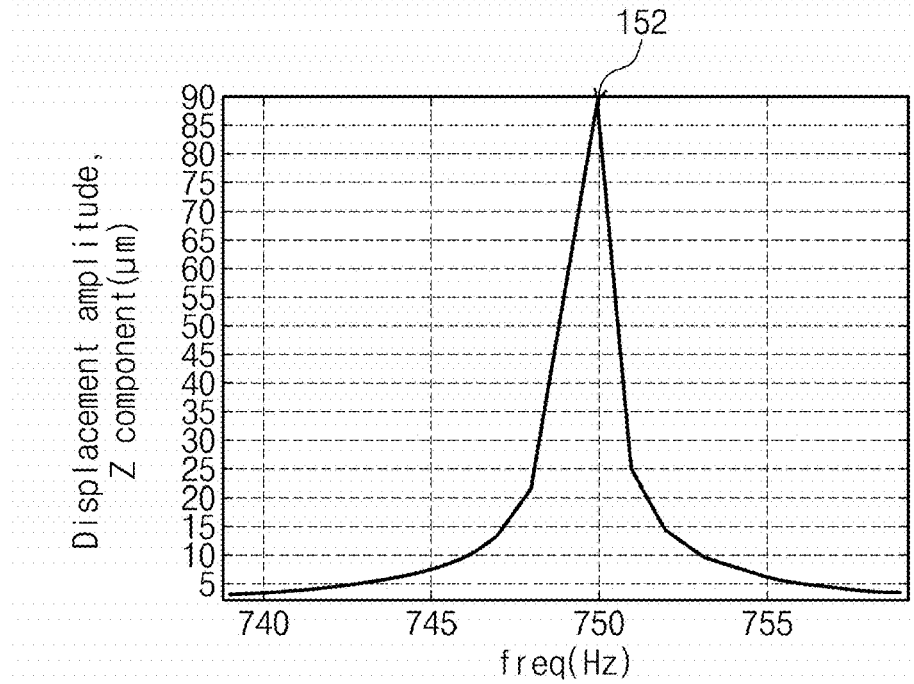
FIGS. 5A and 5B are graphs showing a resonant frequency of a vibration plate in FIG. 4.
Figure 5B:
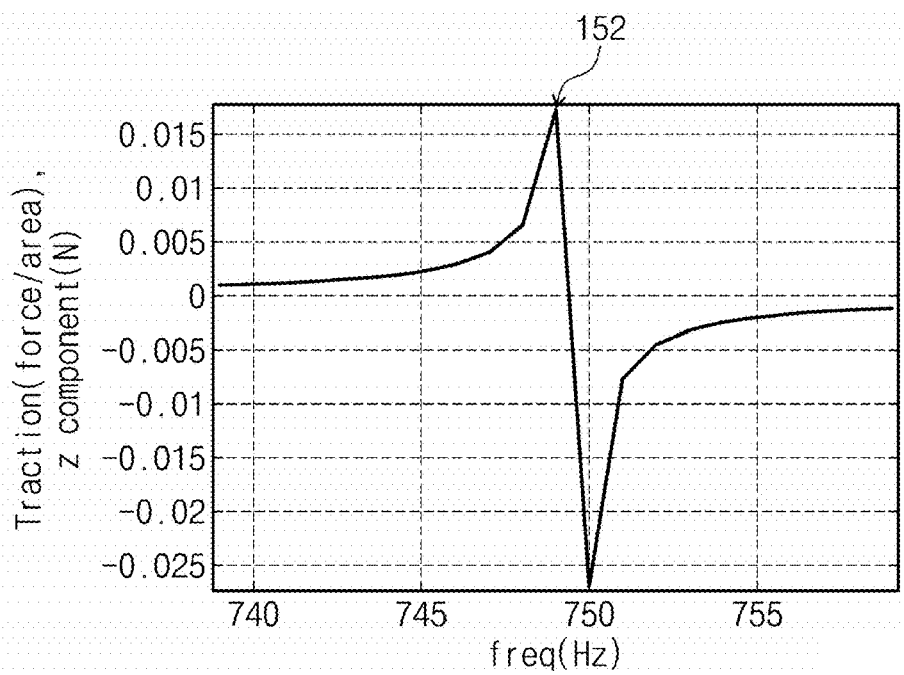

FIGS. 5A and 5B show the resonant frequency 152 of the vibration plate 140 in FIG. 4.

Referring to FIGS. 5A and 5B, the vibration plate 140 may have the resonant frequency 152 of about 750 Hz, the displacement of about 90 μm, and the force of about 0.04N when the vibration plate 140 is vibrated. Since the vibration plate 140 is vibrated with the resonant frequency 152 greater than that of the detectable region 142, the human body may not sense or detect the vibration of the vibration plate 140.

Figure 7A:
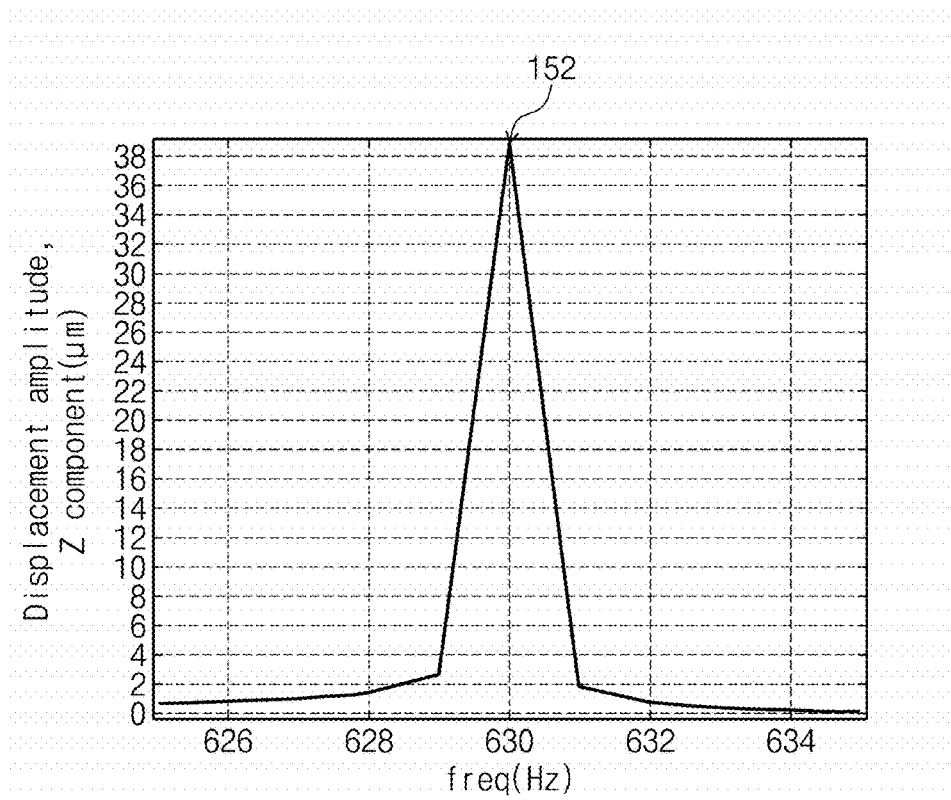
FIGS. 7A and 7B are graphs showing a resonant frequency of a vibration plate and a mass portion in FIG. 6.
Figure 7B:
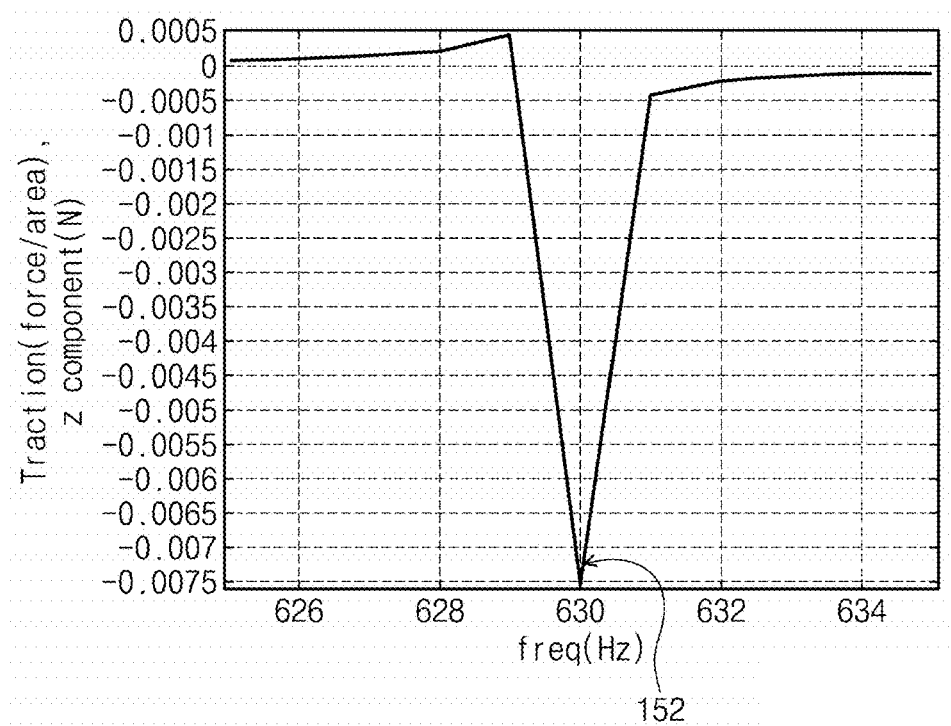

In FIG. 6, the mass portion 150 having the width W2 that is greater than a half of the width W1 of the vibration plate 140. FIGS. 7A and 7B show the resonant frequency 152 of the vibration plate 140 and the mass portion 150 in FIG. 6.

Referring to FIGS. 6, 7A, and 7B, when the mass portion 150 has the width W2 greater than a half of the width W1 of the vibration plate 140, the vibration plate 140 and the mass portion 150 may have the resonant frequency 152 of about 630 Hz, which exceeds the detectable region 142, and the force of about 0.008 N. The human body may not sense the vibration of the vibration actuator device 10.

Referring to FIGS. 1, 2A, and 2B again, when the mass portion 150 has the width W2 less than a half of the width W1 of the vibration plate 140, the vibration plate 140 and the mass portion 150 may have the resonant frequency 152 of about 496 Hz, which is within the detectable region 142, and the human body may sense the vibration of the vibration actuator device 10.

Figure 8:
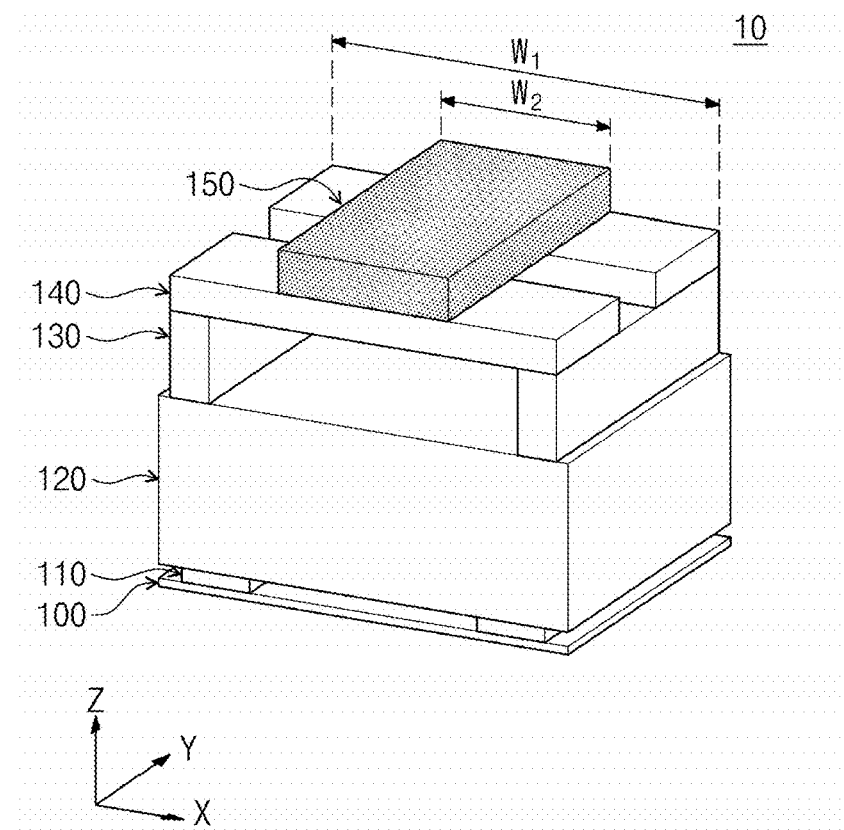
FIG. 8 is a perspective view illustrating a vibration actuator device according to an embodiment of the inventive concept.

FIG. 8 illustrates the vibration actuator device 10 according to an embodiment of the inventive concept.

Referring to FIG. 8, the vibration actuator device 10 according to an embodiment of the inventive concept may include a plurality of vibration plates 140. According to an embodiment, the plurality of vibration plates 140 may be separated in a second direction Y. The plurality of vibration plates 140 may be separated in a form of "11". The substrate 100, the lower supports 110, the actuator 120, the upper supports 130, and the mass portion 150 may be configured in the same manner as in FIGS. 1A and 1B.

Figure 9:
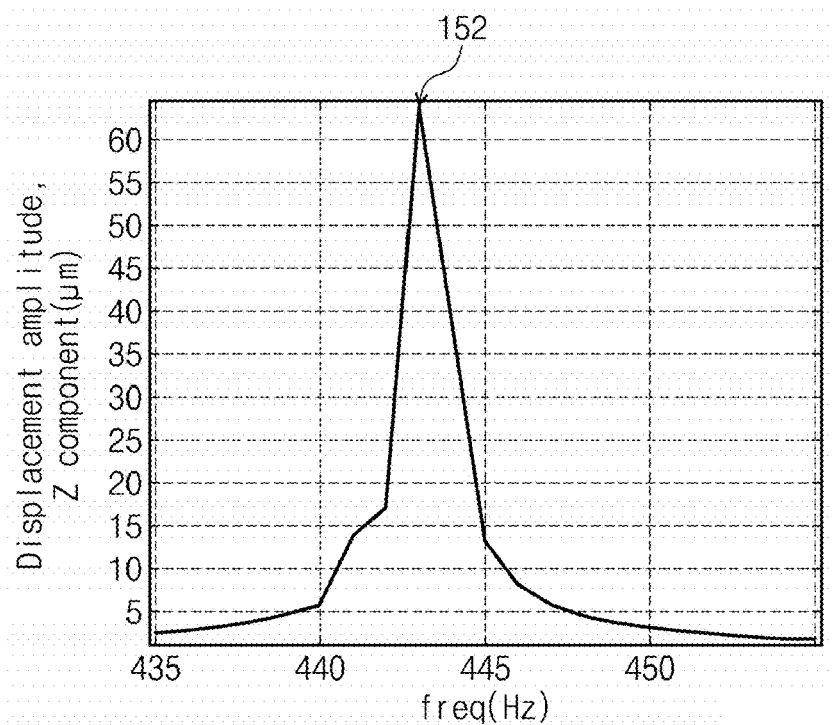
FIG. 9 is a graph showing a resonant frequency of a plurality of vibration plates and a mass portion.

FIG. 9 shows the resonant frequency 152 of the plurality of vibration plates 140 and the mass portion 150 in FIG. 8.

Referring to FIG. 9, the plurality of vibration plates 140 and the mass portion 150 may have the resonant frequency 152 of about 443 Hz and the displacement of about 60 μm when the plurality of vibration plates 140 and the mass portion 150 vibrate. The human body may sense or detect the vibration of the plurality of vibration plates 140 and the mass portion 150.

FIG. 10 illustrates the vibration actuator device 10 according to an embodiment of the inventive concept.

Referring to FIG. 10, the mass portion 150 of the vibration actuator device 10 according to an embodiment of the inventive concept may be disposed in the vibration plate 140. The mass portion 150 may be parallel to the upper plates 130 and disposed between the upper supports 130. The substrate 100, the lower supports 110, the actuator 120, and the upper supports 130 may be configured in the same manner as in FIGS. 1A and 1B.

FIG. 11 illustrates the vibration actuator device 10 according to an embodiment of the inventive concept.

Referring to FIG. 11, the vibration actuator device 10 according to an embodiment of the inventive concept may include a plurality of actuators 120. The plurality of actuators 120 may be stacked in a third direction Z. About 20 or less actuators 120 may be stacked. Each of the actuators 120 may have a thickness of about 50 μm or less. Each of the actuators 120 may produce the first high frequency of several Hz to several hundreds KHz. The substrate 100, the lower supports 110, the upper supports 130, the vibration plate 140, and the mass portion 150 may be configured in the same manner as in FIGS. 1A and 1B.

Figure 12A:
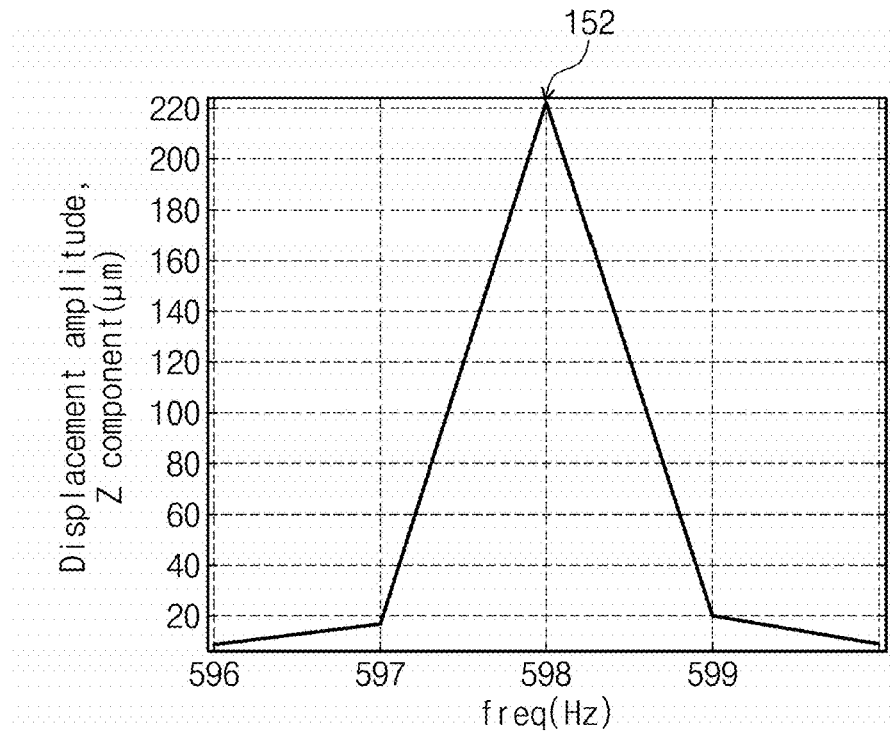
FIGS. 12A and 12B are graphs showing a resonant frequency of a vibration plate and a mass portion in FIG. 11.
Figure 12B:
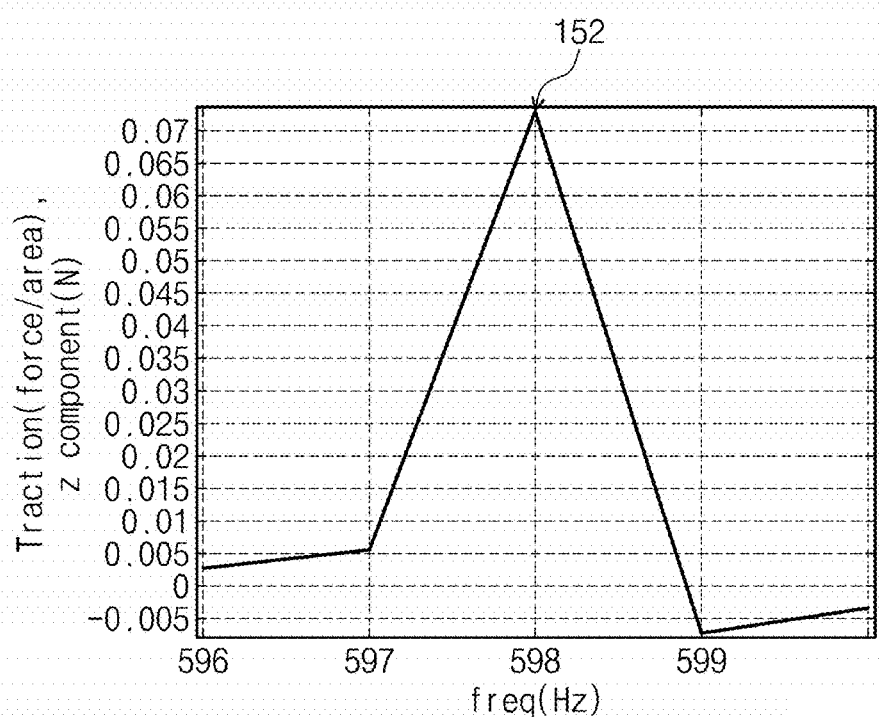

FIGS. 12A and 12B show the resonant frequency 152 of the vibration plate 140 and the mass portion 150 in FIG. 11.

Referring to FIGS. 12A and 12B, the vibration plate 140 and the mass portion 150 may have the resonant frequency 152 of about 598 Hz, the displacement of about 220 μm, and the force of about 0.075N when the vibration plate 140 and the mass portion 150 vibrate. The human body may sense or detect the vibration of the vibration plate 140 and the mass portion 150.

FIGS. 13A and 13B are views illustrating a vibration actuator device 10 according to an embodiment of the inventive concept.

Referring to FIGS. 13A and 13B, the vibration actuator device 10 according to an embodiment of the inventive concept may include a support plate 160, a plurality of actuators 120 disposed on the support plate 160, a vibration plate 140 disposed between the plurality of actuators 120, and a mass portion 150 disposed on the vibration plate 140. The support plate 160 may be disposed between the lower supports 110 and the actuators 120. The support plate 160 may support the actuators 120. The plurality of actuators 120 may be separated from each other in the second direction Y. The actuators 120 may vibrate at a first frequency. The plurality of actuators 120 may vibrate in the same manner or a different manner. The vibration plate 140 may connect the plurality of actuators 120 without the upper supports 130 in FIG. 1. The mass portion 150 may be stacked on the vibration plate 140. That is, the mass portion 150 may have a surface that is less than a half of an area of the vibration plate 140. The substrate 100 and the lower supports 110 may be configured in the same manner as in FIGS. 1A and 1B.

Figure 14A:
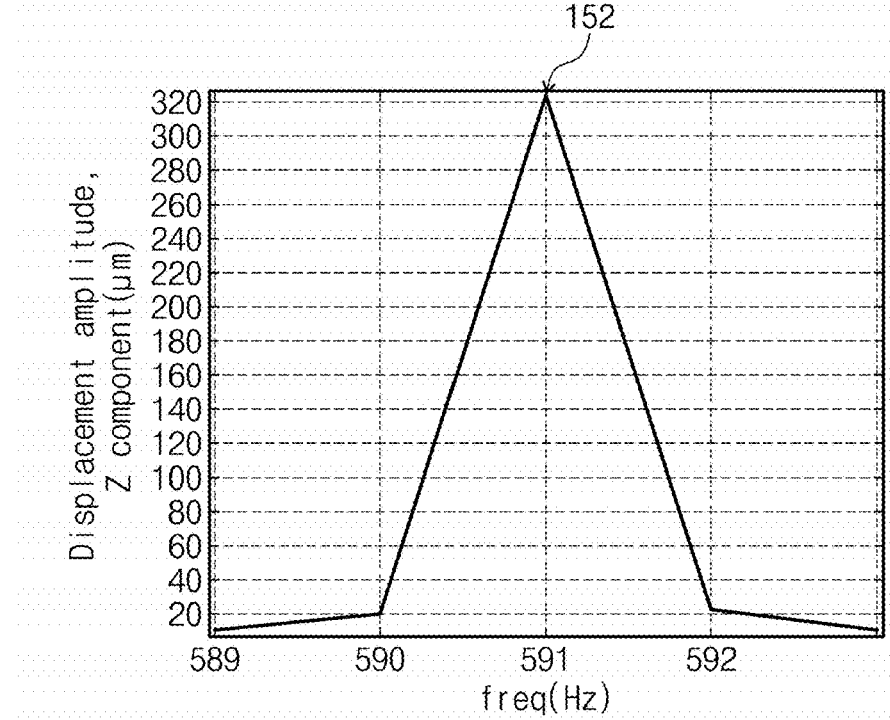
FIGS. 14A and 14B are graphs showing a resonant frequency of a vibration plate and a mass portion in FIGS. 13A and 13B.
Figure 14B:
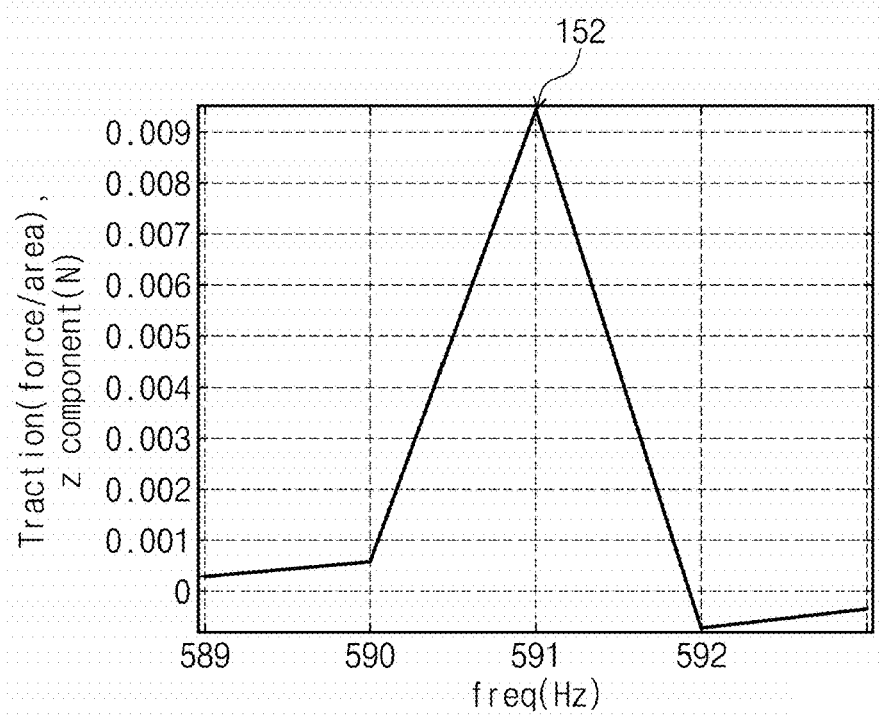

FIGS. 14A and 14B show the resonant frequency 152 of the vibration plate 140 and the mass portion 150 in FIGS. 13A and 13B.

Referring to FIGS. 14A and 14B, the vibration plate 140 and the mass portion 150 may have the resonant frequency 152 of about 591 Hz, the displacement of about 320 μm, and the force of about 0.01N when the vibration plate 140 and the mass portion 150 vibrate. Since the resonant frequency 152 is within the detectable region 142 of the human body, the human body may sense the vibration of the vibration plate 140 and the mass portion 150.

Figure 15:
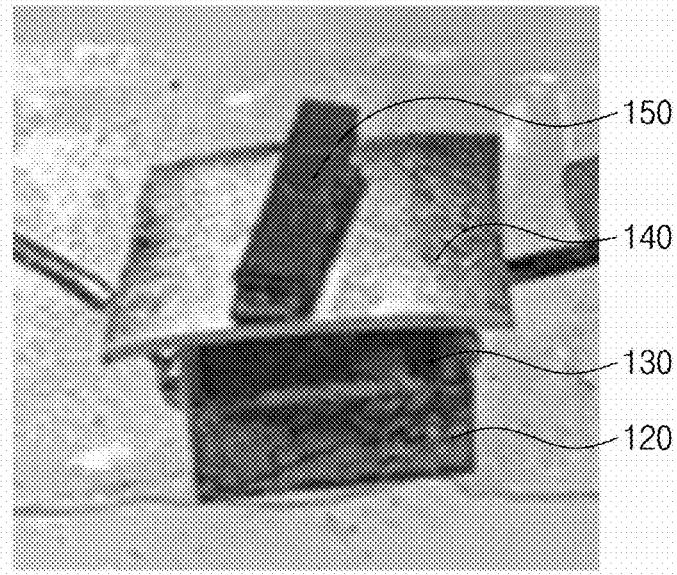
FIG. 15 illustrates one example of a vibration actuator device 10 according to an embodiment of the inventive concept.

FIG. 15 illustrates one example of the vibration actuator device 10 according to an embodiment of the inventive concept.

Referring to FIG. 15, the vibration actuator device 10 according to an embodiment of the inventive concept may have a size of about 5×5×4 mm³. The actuators 120 of the vibration actuator device 10 may have a stacked structure in which about 40 actuators are stacked, and their size may be 5×5×2 mm³. The substrate 100, the lower supports 110, the upper supports 130, the vibration plate 140, and the mass portion 150 may be configured in the same manner as in FIGS. 1A and 1B.

Figure 16:
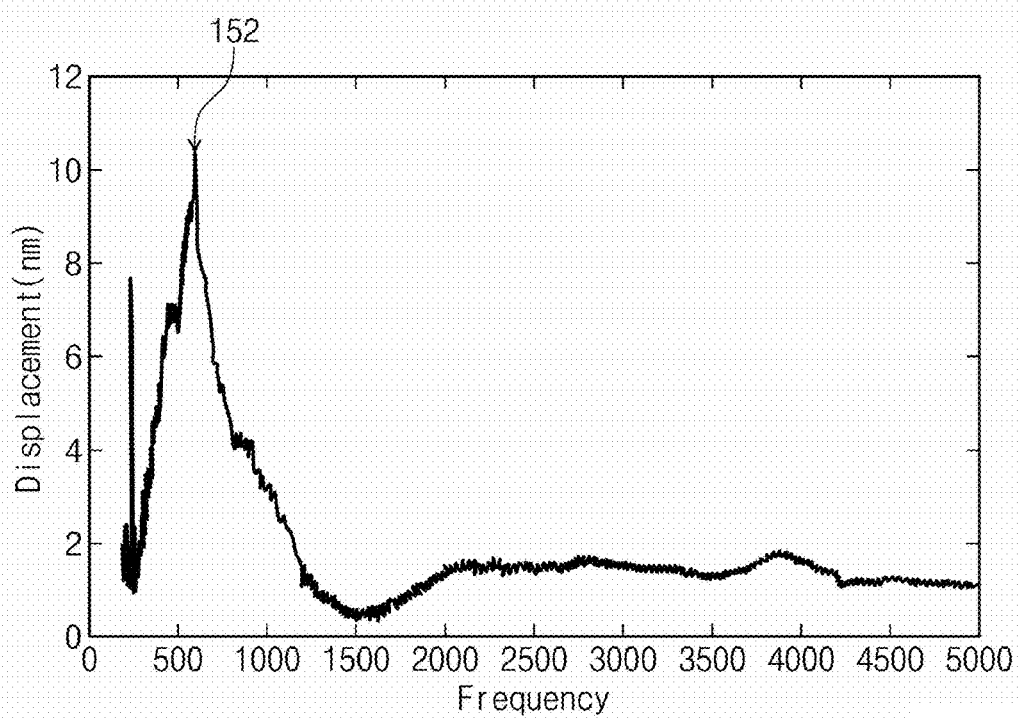
FIG. 16 is a graph showing a resonant frequency 152 of a vibration plate 140 and a mass portion 150 in FIG. 15.

FIG. 16 shows the resonant frequency 152 of the vibration plate 140 and the mass portion 150 in FIG. 15.

Referring to FIG. 16, the vibration plates 140 and the mass portion 150 may have the resonant frequency 152 of about 200 Hz to about 600 Hz and the displacement of about 1 μm when the vibration plate 140 and the mass portion 150 vibrate. The human body may sense or detect the vibration of the vibration plate 140 and the mass portion 150.

FIGS. 17 and 18 illustrate an applied example of the vibration actuator device 10 according to an embodiment of the inventive concept.

Referring to FIGS. 17 and 18, the vibration actuator device 10 according to an embodiment of the inventive concept may include a vibration actuator panel of a touch screen. The vibration actuator device 10 may provide a vibration tactile sense or a vibration stimulus to a skin of the human body. Also, the vibration actuator devices 10 may be transplanted in the human body to provide the vibration stimulus to a brain, a blood vessel, a nerve, and an organ. According to an embodiment, the vibration actuator device 10 according to an embodiment of the inventive concept may include connecting parts 170 for connecting the substrates 100 to each other. The connecting parts 170 may have flexibility and elasticity. For example, the connecting parts 170 may include an elastic elastomer such as PDMS. Alternatively, the connecting parts 170 may be rigid. The connecting parts 170 may include a conductive line having flexibility and elasticity having the serpentine structure. However, the embodiment of the inventive concept is not limited thereto.

The lower supports 110, the actuator 120, the upper supports 130, the vibration plate 140, and the mass portion 150 may be configured in the same manner as in FIGS. 1A and 1B.

As described above, the vibration actuator device according to an embodiment of the inventive concept may generate a vibration having a frequency of about 600 Hz or less, which is detectable by the human body, by using the vibration plate disposed on the actuator and the mass portion disposed on the vibration plate.

The description of the present disclosure is intended to be illustrative, and those with ordinary skill in the technical field of the present disclosure will be understood that the present disclosure can be carried out in other specific forms without changing the technical idea or essential features. Thus, the above-disclosed embodiments are to be considered illustrative and not restrictive.

What is claimed is:

1. A vibration actuator device comprising:
   a substrate:
   lower supports disposed on the substrate and spaced apart from each other in a first direction;
   an actuator disposed on the lower supports to generate a vibration having a first resonant frequency by an external power;
   a vibration plate disposed on the actuator to vibrate in accordance with the actuator;
   upper supports disposed between the actuator and the vibration plate and spaced apart from each other in the first direction; and
   a mass portion disposed on the vibration plate to vibrate in accordance with the actuator and the vibration plate,
   wherein the vibration plate and the mass portion have a second resonant frequency less than the first resonant frequency.

2. The vibration actuator device of claim 1, wherein the mass portion has an area that is equal to or less than a half of an area of the vibration plate.

3. The vibration actuator device of claim 1, wherein the actuator is provided in plurality, and
   the plurality of actuators are spaced apart from each other in a second direction crossing the first direction.

4. The vibration actuator device of claim 3, wherein the vibration plate is disposed between the plurality of actuators.

5. The vibration actuator device of claim 3, further comprising a support plate disposed between the plurality of actuators and the lower supports.

6. The vibration actuator device of claim 1, wherein the mass portion is disposed in the vibration plate between the lower supports.

7. The vibration actuator device of claim 1, wherein the actuator is provided in plurality, and
   the plurality of actuators are stacked.

8. The vibration actuator device of claim 1, wherein the vibration plate has an area of about 5×5 mm² or less.

9. The vibration actuator device of claim 1, wherein the mass portion has a height of about 5 mm or less from the substrate.

10. The vibration actuator device of claim 1, wherein the second resonant frequency is about 600 Hz or less.

11. The vibration actuator device of claim 1, wherein the vibration plate comprises PDMS, polyimide, or silicone.

12. The vibration actuator device of claim 11, wherein the vibration plate further comprises an elastomer.

13. The vibration actuator device of claim 1, wherein the actuator comprises a piezoelectric device.

* * * * *